J. M. HARPER.

Fly-Trap.

No. 6,493. Reissued June 22, 1875.

WITNESSES

Villette Anderson.

George E. Gibbens.

INVENTOR

James M. Harper,

Chipman & Fraser & Co.

ATTORNEYS

THE GRAPHIC CO. PHOTO-LITH. 39 & 41 PARK PLACE, N.Y.

UNITED STATES PATENT OFFICE.

JAMES M. HARPER, OF EL PASO, ILLINOIS.

IMPROVEMENT IN FLY-TRAPS.

Specification forming part of Letters Patent No. 131,098, dated September 3, 1872; reissue No. 6,493, dated June 22, 1875; application filed May 15, 1875.

*To all whom it may concern:*

Be it known that I, JAMES M. HARPER, of El Paso, in the county of Woodford and State of Illinois, have invented a new and Improved Fly-Trap; and I do hereby declare that the following is a full, clear, and exact description of the same, reference being had to the accompanying drawings, making part of this specification, in which—

Figure 1:
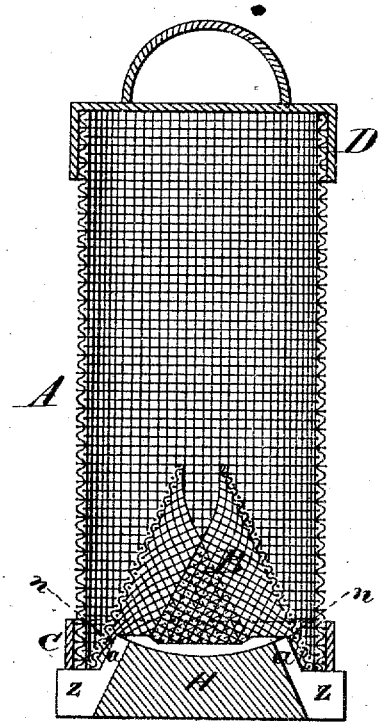
Figure 2:
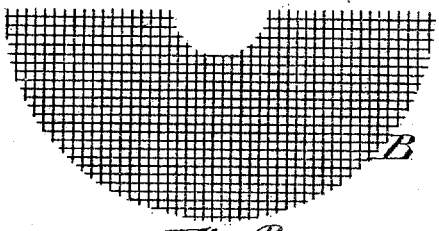
Figure 3:
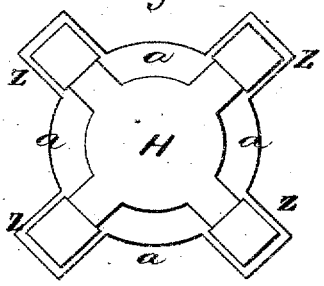

Figure 1 is a section taken diametrically through the trap. Figs. 2 and 3 are detail views of the trap.

Similar letters of reference indicate corresponding parts in the several figures.

This invention has relation to the manufacture of fly-traps; and it consists in a novel construction of the base of the trap, whereby the lower end of the wire-cloth cylinder and peripheral notches in the base-block constitute passages for the flies into the trap. It also consists in a peripherally-notched base having a bait-cavity in its top, in combination with a surrounding wire-cloth cylinder and an internal trapping-cone, as will be hereinafter explained.

In the annexed drawings, A designates a cylinder, which is formed of wire-cloth. B designates a hollow cone, which is made of wire-cloth, with an opening at its apex, and which is secured at its base to the lower edge of the cylinder A. C designates a base-ring encircling the lower end of the cylinder A, and affording support to it; and D is a ring and removable cap, united to serve both as a cover for the top of the cylinder A and a support for the same. H designates the bottom of the trap, formed of a single piece, the bottom of which is flat, and the top recessed to form a receptacle for bait. This base-piece is provided with shoulders *n* and extensions *z*, as shown, to hold the bottom of the cylinder A, leaving spaces between the extensions *z* for the passage of flies upward into the cone B. The base of the cone B is adapted to fit closely the conical shoulders *n* of the bottom piece H, thereby serving to sustain the cylinder in its place, and preventing displacement or accidental overturning.

It will be observed that the passages *a*, through which the flies enter the cone B, are formed by cutting away portions of the periphery of the block H.

I am aware that the base-block of a fly-trap has heretofore been constructed with passages in its periphery and a convex surface inside thereof; and I, therefore, lay no claim to such construction, which affords no receptacle for bait.

What I claim as new, and desire to secure by Letters Patent, is—

1. The concave base-block H, having extensions *z* and shoulders *n*, in combination with the cylinder A and its cone B, substantially as described.

2. The base H, having passages *a* in its periphery and a concavity inside thereof, in combination with cylinder A, substantially as described.

In testimony that I claim the above I have hereunto subscribed my name in the presence of two witnesses.

JAMES M. HARPER.

Witnesses:
GEO. L. GIBSON,
JOHN T. HARPER.